United States Patent [19]

Diebold et al.

[11] 3,711,476

[45] Jan. 16, 1973

[54] SPIRO 2H-3,1-BENZOXAZINE DERIVATIVES

[75] Inventors: James L Diebold, Broomall; Milton Wolf, West Chester, both of Pa.

[73] Assignee: American Home Products Corporation, New York, N.Y.

[22] Filed: March 12, 1971

[21] Appl. No.: 123,849

[52] U.S. Cl.......260/244 R, 260/239 BF, 260/243 R, 260/243 B, 260/246 R, 260/327 R, 260/333 R, 260/571, 424/246, 424/248
[51] Int. Cl. .............................................C07d 57/14
[58] Field of Search.............................260/244, 243

[56] References Cited

UNITED STATES PATENTS 3,600,214   8/1971   Feinauer ..........................260/244

Primary Examiner—Harry I Moatz
Attorney—Vito Victor Bellino, Andrew Kafko, Joseph Martin Weigman and Dwight J. Potter

[57] ABSTRACT

The disclosure is directed to derivatives of spiro 2H-3,1-benzoxazine prepared by reacting a mixture of 2-amino-5-chlorophenylbenzyl alcohol and an appropriately substituted piperidone, isatin or quinuclidone derivative. The compounds are useful as antiamebics in vitro, and some are central nervous depressants.

5 Claims, No Drawings

SPIRO 2H-3,1-BENZOXAZINE DERIVATIVES

This invention describes the novel 4-phenylspiro[2H-3,1-benzoxazineheterocycloalkone] derivatives obtained by the reaction of 2-aminophenylbenzyl alcohol with a heterocyclo-alkanone in the presence of an acid catalyst.

The compounds within the purview of the present invention have the following formula:

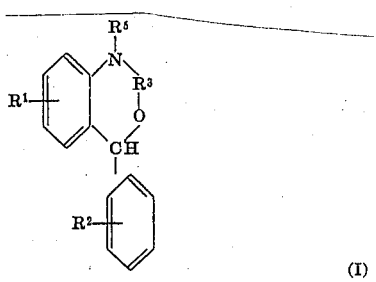

(I)

Where $R^1$ and $R^2$ are the same or different members selected from the class consisting of hydrogen, halogen, nitro, cyano, trifluoromethyl, lower alkyl, lower alkoxy, lower alkylthio, phenyl, halophenyl, lower alkylphenyl, lower alkoxy-phenyl and phen(lower)alkyl;

$R^3$ is selected from the group consisting of

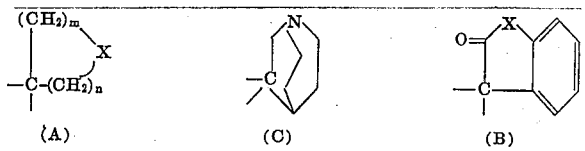

where
  X is oxa, thia or $-NR^4$;
  $R^4$ is hydrogen or lower alkyl;
  $R^5$ is hydrogen, lower alkyl or di(lower)alkylamino-(lower)alkyl;
  m is an integer from 1 to 6; and
  n is an integer from 1 to 6 with the proviso that the sum of m and n is no greater than 7.

As defined herein, the terms "lower alkyl," "lower alkoxy" and the like describe groups having from one to four carbon atoms.

A typical example of the compounds of this invention which are depicted by structural Formula (I) is 6-chloro-1,4-dihydro-1'-methyl-4-phenylspiro[2H-3,1-benzoxazine-2,4'-piperidine].

The new and useful compounds of this invention may be prepared by the process which is hereinafter schematically illustrated, $R^1-R^5$ being defined as described above:

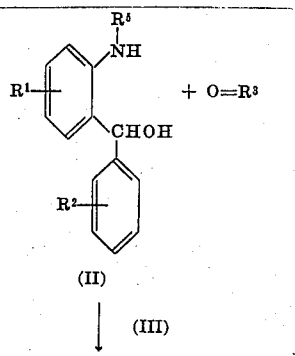

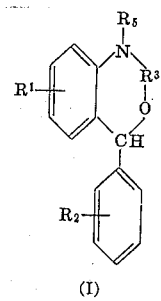

(I)

The starting materials used in the preparation of the claimed compounds are generally known and can be prepared by well known procedures. The products of the present invention may be prepared by mixing 2-amino-5-chlorophenylbenzyl alcohol (II) with a heterocycloalkanone (III) in the presence of an acid catalyst and heating the mixture for a period of one to thirty hours. When the reaction is complete, the product, a spiro 2H-3,1-benzoxazine derivative (I), may be separated by standard recovery methods. For instance, the solution may be evaporated and the residue triturated with ether giving a solid. Recrystallization of the solid from benzene affords the pure compound. The acid catalyst may be any of those well known for such purpose, preferably zinc chloride, p-toluene sulfonic acid and the like. The reaction period varies with the reactants and preferably is about 3 to 20 hours. The reaction temperature is preferably the reflux temperature but lower temperatures may be used with an appropriate longer reaction time as is well understood in the art.

In the pharmacological evaluation of the biological activity of the compounds of this invention, the in vitro effects are tested as follows. The test substance is incorporated and diluted in the aqueous phase of modified Boeck-Drbohlav diphasic medium fortified with rice starch. The medium is inoculated with polybacteria, and a known number of trophozolites of Endameba histolytica NIH 200. After 48 hours incubation at 35°C. the trophozolites are counted. The minimal inhibitory concentration (MIC) expressed in micrograms per milliliter ($\mu$g/ml) is the least amount of a test compound that completely inhibits *Endameba histolytica*. The activity of the compounds is compared against emetine hydrochloride as a standard. This procedure is suggested in Thompson et al., Antibio. & Chemo. 6, (1956), 337–50. Some of the compounds of the present invention were found to produce a 100 percent kill at an MIC of 15.6 to 125. All of the substances produced better than 80 percent kill at 1000 MIC.

In the pharmacological evaluation of the biological activity of the compounds of this invention, the in vivo effects are tested as follows. The compound is administered orally or intraperitoneally to three mice (14 to 24 grams) at each of the following doses: 400, 127, 40 and 12.7 milligrams per kilogram of host body weight (MPK). The animals are watched for a minimum of two hours during which time signs of general stimulation (i.e., increased spontaneous motor activity, hyperactivity on tactile stimulation, twitching), general depression (i.e., decreased spontaneous motor activity, decreased respiration), autonomic activity (i.e., miosis, mydriasis, diarrhea) are noted.

The compounds of this invention induce central nervous system depressant effects at a dose of 127 to 400 MPK.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims. In the examples, all temperatures are stated in degrees Centigrade, and the following abbreviations are used: "g." for grams, "ml." for milliliters, "m" for gram molecular weight, "hrs." for hours, and "φ" for phenyl ($C_6H_5$).

EXAMPLE I

The following example illustrates the preparation of 6-chloro-1,4-dihydro-1'-methyl-4-phenylspiro[2H-3,1-benzoxazine-2,4'-piperidine].

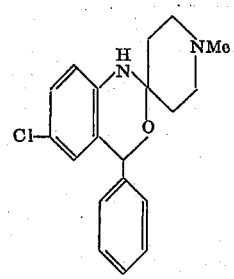

A mixture of 2-amino-5-chlorophenylbenzyl alcohol (5.0 g., 0.0215 m.), 1-methyl-4-piperidone (2.40 g., 0.0215 m.), a catalytic amount of zinc chloride and 100 ml. of xylene is refluxed for 3 hours over a Dean-Stark trap. The solution is evaporated and the residue triturated with ether giving a solid. Recrystallization from benzene affords 6-chloro-1,4-dihydro-1'-methyl-4-phenylspiro[2H-3,1-benzoxazine-2,4'-piperidine] as a crystalline solid (3.6 g., 51 percent yield) having a melting point of 116°–117° (uncorrected).

Based on the assumed molecular formula $C_{19}H_{21}ClN_2O$, it was calculated that the elemental analysis by weight would be 69.40 percent carbon, 6.43 percent hydrogen and 8.52 percent nitrogen. The product was analyzed and found to contain 69.49 percent carbon, 6.29 percent hydrogen, and 8.41 percent nitrogen which confirmed the accuracy of the assumed formula. This may be expressed:

Anal. Calcd. for $C_{19}H_{21}ClN_2O$: C, 69.40; H, 6.43; N, 8.52.

Found: C, 69.49; H, 6.29; N, 8.41.

The product was analyzed in the foregoing pharmacological procedures and found to kill 100 percent *E. histolytica* at a concentration of 125 μg/ml (emetine 0.975) in vitro, and to induce decreased motor activity and decreased respiration at a dose of 127 MPK administered intraperitoneally.

EXAMPLE II

The following illustrates the preparation of 1'-benzyl-6-chloro-1,4-dihydro-4-phenylspiro[2H-3,1-benzoxazine-2,3'-piperidine].

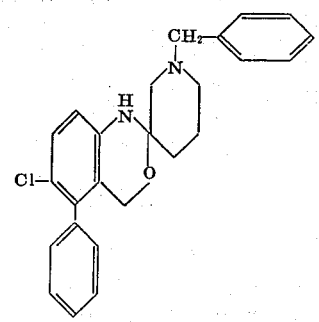

2-Amino-5-chlorophenylbenzylalcohol (10.0 g., 0.043 m.) and 1-benzyl-3-piperidone (8.13 g., 0.043 m.) are allowed to react in a manner similar to Example I except employing a trace of p-toluene sulfonic as acid catalyst and toluene as solvent. The residue is triturated with ether and pentane and then filtered. The solid which precipitates from the filtrate is recrystallized from benzene-hexane affording 1'-benzyl-6-chloro-1,4-dihydro-4-phenylspiro[2H-3,1-benzoxazine-2,3'-piperidine] as a crystalline solid having a melting point of 135°–137°C (uncorrected).

Anal. Calcd. for $C_{25}H_{25}ClN_2O$: C, 74.16; H, 6.38; N, 6.92.

Found: C, 74.06; H, 5.84; N, 6.66.

The product was analyzed in the foregoing pharmacological procedures and found to kill 70 percent *E. histolytica* at a concentration of 250 μg/ml and 81 percent at a concentration of 1,000 μg/ml in vitro (emetine 0.488).

Following the procedure of Example I but substituting appropriate starting materials, products having the following substituents may be obtained:

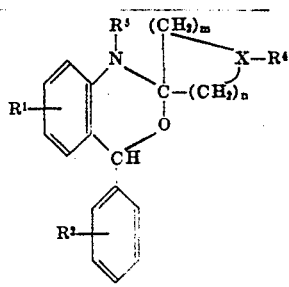

| | m | n | X | R¹ | R² | R⁴ | R⁵ |
|---|---|---|---|---|---|---|---|
| I | 2 | 2 | Aza | 6-Cl | H | CH₃ | H |
| II | 1 | 3 | Aza | 6-Cl | H | φCH₂— | H |
| II-1 | 3 | 3 | Thia | 7-F | H | | (CH₃)₂N(CH₂)₃— |
| II-2 | 4 | 3 | Oxa | 5-Br | m-Cl | | CH₃— |
| II-3 | 5 | 2 | Aza | 8-I | o-Br | C₃H₇ | (C₂H₅)₂N(CH₂)₃— |
| II-4 | 6 | 1 | Thia | 5-NO₂ | o-I | | C₂H₅— |
| II-5 | 1 | 1 | Oxa | 6-CN | p-NO₂ | | (C₃H₇)₂N(CH₂)₃— |
| II-6 | 2 | 3 | Aza | 7-CF₃ | m-CN | C₄H₉ | C₃H₇— |
| II-7 | 3 | 4 | Thia | 8-CH₃ | o-CF₃ | | (C₄H₉)₂N(CH₂)₃— |
| II-8 | 4 | 2 | Oxa | 5-C₂H₅ | p-CH₃ | | C₄H₉— |
| II-9 | 5 | 1 | Aza | 6-C₃H₇ | H | C₃H₇ | (CH₃)₂N(CH₂)₃— |
| II-10 | 6 | 1 | Thia | 7-C₄H₉ | m-C₂H₅ | | (C₂H₅)₂N(CH₂)₃— |
| II-11 | 1 | 6 | Oxa | 8-CH₃O | o-C₃H₇ | | CH₃ |
| II-12 | 2 | 5 | Aza | 5-C₂H₅O | p-C₄H₉ | C₂H₅ | (C₃H₇)₂N(CH₂)₃— |
| II-13 | 3 | 4 | Thia | 6-C₃H₇O | m-CH₃O | | (C₄H₉)₂N(CH₂)₃— |
| II-14 | 4 | 3 | Oxa | 7-C₄H₉O | o-C₂H₅O | | C₂H₅ |
| II-15 | 5 | 2 | Aza | 8-CH₃S | p-C₃H₇O | C₃H₇ | (CH₃)₂N(CH₂)₃— |
| II-16 | 6 | 1 | Thia | 5-C₂H₅S | H | | (C₂H₅)₂N(CH₂)₃— |
| II-17 | 1 | 2 | Oxa | 6-C₃H₇S | m-CH₃S | | (C₃H₇)₂N(CH₂)₃— |
| II-18 | 2 | 1 | Aza | 7-C₄H₉S | o-C₂H₅S | C₃H₇ | (C₄H₉)₂N(CH₂)₃— |
| II-19 | 3 | 1 | Thia | 8-φ | p-C₄H₉S | | C₃H₇ |
| II-20 | 4 | 2 | Oxa | 5-(p-Clφ)— | m-φ | | C₄H₉ |
| II-21 | 1 | 3 | Aza | 5-(p-Brφ) | 3-(p-Clφ)— | H | (C₄H₉)₂N(CH₂)₃— |
| II-22 | 2 | 4 | Thia | 6-(m-Fφ)— | m-Cl | | (C₃H₇)₂N(CH₂)₄— |
| II-23 | 3 | 2 | Oxa | 7-(p-Iφ)— | p-NO₂ | | (C₂H₅)₂N(CH₂)₄— |
| II-24 | 1 | 4 | Aza | 8-(o-Clφ)— | o-cl | C₃H₇ | (CH₃)₂N(CH₂)₄— |
| II-25 | 4 | 1 | Thia | 5-(o-CH₃φ)— | m-CF₃ | | H |
| II-26 | 5 | 1 | Oxa | 6-(m-C₂H₅φ)— | p-CH₃ | | CH₃ |
| II-27 | 1 | 5 | Aza | 7-(p-C₃H₇φ)— | o-Cl | H | C₂H₅ |
| II-28 | 2 | 4 | Thia | 8-(p-C₄H₉O)— | m-CH₃ | | (CH₃)₂N(CH₂)₃— |
| II-29 | 4 | 1 | Oxa | 5-(φCH₂)— | p-(φ-CH₃)— | | C₃H₇ |
| II-30 | 1 | 3 | Aza | 6-(2-φC₃H₆)— | o-CH₃O— | H | (C₂H₅)₂N(CH₂)₃— |
| II-31 | 2 | 2 | Thia | 7-(2-φC₃H₇)— | H | | C₂H₅ |
| II-32 | 4 | 3 | Oxa | 8-(4-φC₄H₈)— | H | | H |
| II-33 | 3 | 4 | Aza | 5-Cl | m-Cl | C₂H₅ | (CH₃)₂N(CH₂)₄— |
| II-34 | 2 | 4 | Thia | 6-CH₃ | p-CH₃ | | CH₃ |
| II-35 | 1 | 5 | Oxa | 8-CH₃O— | o-CH₃O— | | H |
| II-36 | 4 | 1 | Aza | 7-φ | m-φ— | H | (C₂H₅)₂N(CH₂)₂— |
| II-37 | 1 | 6 | Thia | 5-(p-CH₃φ)— | 2-,p-CH₃φ) | | CH₃ |
| II-38 | 3 | 4 | Oxa | H | H | | (CH₃)₂N(CH₂)₃ |
| II-39 | 6 | 1 | Aza | 6-(3-φC₃H₆)— | 4-(3-φC₃H₆)— | CH₃ | C₂H₅ |
| II-40 | 2 | 2 | Thia | 7-(2-φC₄H₈)— | 4-(φCH₂) | | (CH₃)₂N(CH₂)₃— |

EXAMPLE III

The following illustrates the preparation of 6-chloro-1,4-dihydro-4-phenyl[2H-3,1-benzoxazine-2,3'-indolin]-2'-one.

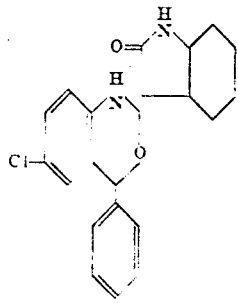

2-Amino-5-chlorophenylbenzylalcohol (8.0 g., 0.034 m.) and isatin (5.0 g., 0.034 m.) are allowed to react in a manner similar to Example II except for a 20 hour reflux time. Recrystallization of the product from dimethylformamide-benzene affords 6-chloro-1,4-dihydro-4-phenyl[2H-3,1-benzoxazine-2,3'-indolin]-2'-one as a crystalline solid which decomposes at 248°-249°C. (uncorrected).

Anal. Calcd. for $C_{21}H_{15}ClN_2O_2$: C, 69.52; H, 4.17; N, 7.72.

Found: C, 69.81; H, 3.89; N, 7.92.

The product was analyzed in the foregoing analytical procedures and found to kill 91 percent *E. histolytica* at a concentration of 1,000 μg/ml in vitro (emetine 0.975), and to induce decreased respiration and decreased motor activity at a dose of 400 MPK administered intraperitoneally.

Following the procedure of Example III but substituting appropriate starting materials, products having the following substituents may be obtained:

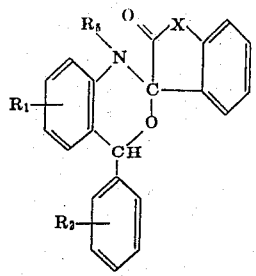

| | X | R₁ | R₂ | R₄ | R₅ |
|---|---|---|---|---|---|
| III | Aza | Cl | H | H | H |
| III-1 | Thia | 7-F | H | | (CH₃)₂N(CH₂)₂— |
| III-2 | Oxa | 5-Br | m-Cl | | CH₃— |
| III-3 | Aza | 8-I | o-Br | C₃H₇ | (C₂H₅)₂(CH₂)₂— |
| III-4 | Thia | 5-NO₂ | o-I | | C₂H₅— |
| III-5 | Oxa | 6-CN | p-NO₂ | | (C₃H₇)₂N(CH₂)₂— |
| III-6 | Aza | 7-CF₃ | m-CN | C₄H₉ | C₃H₇— |
| III-7 | Thia | 8-CH₃ | o-CF₃ | | (C₄H₉)₂N(CH₂)₂— |
| III-8 | Oxa | 5-C₂H₅ | p-CH₃ | | C₄H₉— |
| III-9 | Aza | 6-C₃H₇ | H | C₃H₇ | ((CH₃)₂N(CH₂)₂— |
| III-10 | Thia | 7-C₄H₉ | m-C₂H₅ | | (C₂H₅)₂N(CH₂)₂— |
| III-11 | Oxa | 8-CH₃O | o-C₃H₇ | | CH₃ |
| III-12 | Aza | 5-C₂H₅O | p-C₄H₉ | C₂H₅ | (C₃H₇)₂(CH₂)₂— |
| III-13 | Thia | 6-C₃H₇O | m-CH₃O | | (C₄H₉)₂N(CH₂)₂— |
| III-14 | Oxa | 7-C₄H₉O | o-C₂H₅O | | C₂H₅ |
| III-15 | Aza | 8-CH₃S | p-C₃H₇ | C₃H₇ | (CH₃)₂N(CH₂)₃— |
| III-16 | Thia | 5-C₂H₅S | H | | (C₂H₅)₂N(CH₂)₃— |
| III-17 | Oxa | 6-C₃H₇S | m-CH₃S | | (C₃H₇)₂N(CH₂)₃— |
| III-18 | Aza | 7-C₄H₉S | o-C₂H₅S | C₂H₅ | (C₄H₉)₂N(CH₂)₃— |
| III-19 | Thia | 8-φ | p-C₄H₉S | | C₃H₇ |
| III-20 | Oxa | 5-(p-Clφ)— | m-φ | | C₄H₈ |
| III-21 | Aza | 5-(p-Brφ)— | 3-(p-Clφ)— | H | (C₄H₉)₂N(CH₂)₄— |
| III-22 | Thia | 6-(m-Fφ)— | m-Cl | | (C₃H₇)₂N(CH₂)₄— |
| III-23 | Oxa | 7-(p-Iφ)— | p-NO₂ | | (C₂H₅)₂N(CH₂)₄— |
| III-24 | Aza | 8-(o-Clφ)— | o-Cl | C₃H₇ | (CH₃)₂N(CH₂)₄— |
| III-25 | Thia | 5-(o-CH₃φ)— | m-CF₃ | | H |
| III-26 | Oxa | 6-(m-C₂H₅φ)— | p-CH₃ | | CH₃ |
| III-27 | Aza | 7-(p-C₃H₇φ)— | o-Cl | H | C₂H₅ |
| III-28 | Thia | 8-(p-C₄H₉O)— | m-CH₃ | | (CH₃)₂N(CH₂)₂— |
| III-29 | Oxa | 5-(φCH₂)— | p-(φ-CH₂)— | | C₃H₇ |
| III-30 | Aza | 6-(2-φC₂H₄)— | o-CH₃O— | H | (C₂H₅)₂N(CH₂)₂— |
| III-31 | Thia | 7-(2-φC₃H₇)— | H | | C₂H₅ |
| III-32 | Ox | 8-(4-φC₄H₉)— | H | | H |
| III-33 | Aza | 5-Cl | m-Cl | C₂H₅ | (CH₃)₂(CH₂)₄— |
| III-34 | Thia | 6-CH₃ | p-CH₃ | | CH₃ |
| III-35 | Oxa | 8-CH₃O— | o-CH₃O— | | H |
| III-36 | Aza | 7-φ— | m-φ— | H | (C₂H₅)₂N(CH₂)₂— |
| III-37 | Thia | 5-(p-CH₃φ)— | 2-(p-CH₃φ)— | | CH₃ |
| III-38 | Oxa | H | H | | (CH₃)₂N(CH₂)₂— |
| III-39 | Aza | 6-(3-φC₃H₆)— | 4-(3-φ-C₃H₆)— | CH₃ | C₂H₅ |
| III-40 | Thia | 7-(2-φC₄H₈)— | 4-(φCH₂) | | (CH₃)₂N(CH₂)₂— |

EXAMPLE IV

The following illustrates the preparation of 6-chloro-1,4-dihydro-4-phenylspiro[2H-3,1-benzoxazine-2,3'-quinuclidine].

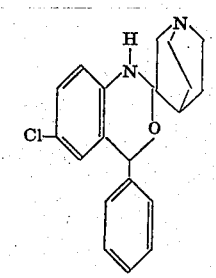

2-Amino-5-chlorophenylbenzylalcohol (5.0 g., 0.0215 m.) and 3-quinuclidone (3.0 g., 0.0239 m.) are allowed to react in a manner similar to Example II. A solid is obtained upon heating the crude product with hexane. Recrystallization from benzene-hexane affords 6-chloro-1,4-dihydro-4-phenylspiro[2H-3,1-benzoxazine-2,3'-quinuclindine] as a crystalline solid having a melting point of 164°–167°C (uncorrected).

Anal. Calcd. for $C_{20}H_{21}ClN_2O$: C, 70.46; H, 6.21; N, 8.22.

Found: C, 70.75; H, 5.90; N, 8.14.

The product was analyzed in the foregoing pharmacological procedures and found to kill 100 percent *E. histolytica* at a concentration of 15.6 μg/ml in vitro (emetine 0.244) and to induce decreased respiration and decreased motor control at a dose of 127 MPK administered orally.

Following the procedure of Example IV but substituting appropriate starting materials, products having the following substituents may be prepared:

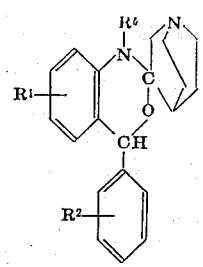

| | R¹ | R² | R⁵ |
|---|---|---|---|
| IV | Cl | H | H |
| IV–1 | 7-F | H | (CH₃)₂N(CH₂)₂— |
| 2 | 5-Br | m-Cl | CH₃— |
| 3 | 8-I | o-Br | (C₂H₅)₂N(CH₂)₂— |

| | | | |
|---|---|---|---|
| 4 | 5-NO$_2$ | o-I | C$_2$H$_5$— |
| 5 | 6-CN | p-NO$_2$ | (C$_3$H$_7$)$_2$N(CH$_2$)$_2$b— |
| 6 | 7-CF$_3$ | m-CN | C$_3$H$_7$— |
| 7 | 8-CH$_3$ | o-CF$_3$ | (C$_4$H$_9$)$_2$N(CH$_2$)$_2$b— |
| 8 | 5-C$_2$H$_5$ | p-CH$_3$ | C$_4$H$_9$— |
| 9 | 6-C$_3$H$_7$ | H | (CH$_3$)$_2$N(CH$_2$)$_2$— |
| 10 | 7-C$_4$H$_9$ | m-C$_2$H$_5$ | (C$_2$H$_5$)$_2$N(CH$_2$)$_2$b— |
| 11 | 8-CH$_3$O | o-C$_3$H$_7$ | CH$_3$ |
| 12 | 5-C$_2$H$_5$O | p-C$_4$H$_9$ | (C$_3$H$_7$)$_2$N(CH$_2$)$_2$b— |
| 13 | 6-C$_3$H$_7$O | m-CH$_3$O | (C$_4$H$_9$)$_2$N(CH$_2$)$_2$b— |
| 14 | 7-C$_4$H$_9$O | o-C$_2$H$_5$O | C$_2$H$_5$ |
| 15 | 8-CH$_3$S | p-C$_3$H$_7$O | (CH$_3$)$_2$N(CH$_2$)$_3$— |
| 16 | 5-C$_2$H$_5$S | H | (C$_2$H$_5$)$_2$N(CH$_2$)$_3$b— |
| 17 | 6-C$_3$H$_7$S | m-CH$_3$S | (C$_3$H$_7$)$_2$N(CH$_2$)$_3$b— |
| 18 | 7-C$_4$H$_9$S | o-C$_2$H$_5$S | (C$_4$H$_9$)$_2$N(CH$_2$)$_3$b— |
| 19 | 8-φ | p-C$_4$H$_9$S | C$_3$H$_7$ |
| 20 | 5-(p-Clφ)- | m-φ | C$_4$H$_9$ |
| 21 | 5-(p-Brφ)— | 3-(p-Clφ)— | (C$_4$H$_9$)$_2$N(CH$_2$)$_4$b— |
| 22 | 6-(m-Fφ)— | m-Cl | (C$_3$H$_7$)$_2$N(CH$_2$)$_4$b— |
| 23 | 7-(p-Iφ)— | p-NO$_2$ | (C$_2$H$_5$)$_2$N(CH$_2$)$_4$b— |
| 24 | 8-(o-Clφ)— | o-Cl | (CH$_3$)$_2$N(CH$_2$)$_4$— |
| 25 | 5-(o-CH$_3$φ)— | m-CF$_3$ | H |
| 26 | 6-(m-C$_2$H$_5$φ)— | p-CH$_3$ | CH$_3$ |
| 27 | 7-(p-C$_3$H$_7$O)— | o-Cl | C$_2$H$_5$ |
| 28 | 8-(p-C$_4$H$_9$O)— | m-CH$_3$ | (CH$_3$)$_2$N(CH$_2$)$_2$— |
| 29 | 5-(φCH$_2$)— | p-(φ—CH$_2$) | C$_3$H$_7$ |
| 30 | 6-(2-φC$_2$H$_4$)— | o-CH$_3$O— | (C$_2$H$_5$)$_2$N(CH$_2$)$_2$b— |
| 31 | 7-(2-φC$_2$H$_7$)— | H | C$_2$H$_5$ |
| 32 | 8-(4-φC$_4$H$_9$)— | H | H |
| 33 | 5-Cl | m-Cl | (CH$_3$)$_2$N(CH$_2$)$_4$— |
| 34 | 6-CH$_3$ | p-CH$_3$ | CH$_3$ |
| 35 | 8-CH$_3$O— | o—CH$_3$O— | H |
| 36 | 7—φ— | m-φ- | (C$_2$H$_5$)$_2$N(CH$_2$)$_2$b— |
| 37 | 5-(p-CH$_3$φ)— | 2-(p-CH$_3$φ)— | CH$_3$ |
| 38 | H | H | (CH$_3$)$_2$N(CH$_2$)$_2$— |
| 39 | 6-(3-φC$_3$H$_6$)— | 4-(3-φC$_3$H$_6$)— | C$_2$H$_5$ |
| 40 | 7-(2-φC$_4$H$_8$)— | 4-(φCH$_2$) | (CH$_3$)$_2$N(CH$_2$)$_2$— |

What is claimed is:

1. A compound selected from those having the formula:

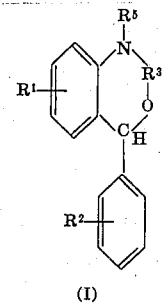

(I)

where R$^1$ and R$^2$ are the same or different members selected from the class consisting of hydrogen, halogen, nitro, cyano, trifluoromethyl, lower alkyl, lower alkoxy, lower alkylthio, phenyl, monohalophenyl, mono(lower)alkylphenyl, mono(lower) alkoxyphenyl and phen(lower)alkyl;

R$^3$ is selected from the group consisting of

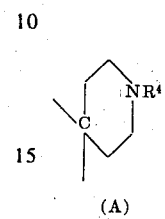

(A)

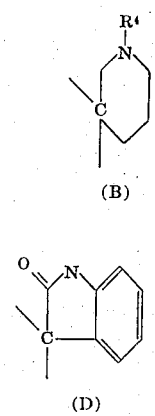

(B)

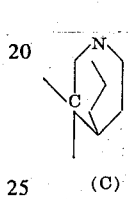

(C)

(D)

R$^4$ is hydrogen, lower alkyl or benzyl; and

R$^5$ is hydrogen, lower alkyl or di(lower)alkylamino(lower)alkyl.

2. A compound as described in claim 1 which is 6-chloro-1,4-dihydro-1'-methyl-4-phenylspiro[2H-3,1-benzoxazine-2,4'-piperidine].

3. A compound as described in claim 1 which is 1'-benzyl-6-chloro-1,4-dihydro-4-phenylspiro[2H-3,1-benzoxazine-2,3'-piperidine].

4. A compound as described in claim 1 which is 6-chloro-1,4-dihydro-4-phenyl[2H-3,1-benzoxazine-2,3'-indolin]-2'-one.

5. A compound as described in claim 1 which is 6-chloro-1,4-dihydro-4-phenylspiro[2H-3,1-benzoxazine-2,3'-quinuclidine].

* * * * *